US010993568B2

(12) United States Patent
Chambers et al.

(10) Patent No.: US 10,993,568 B2
(45) Date of Patent: *May 4, 2021

(54) INTEGRATED PACKAGE AND MAIL SECURITY SYSTEM IMPLEMENTING ENRICHED CUSTOMER AND DELIVERY SERVICE CAPABILITIES

(71) Applicant: IMDSS Solutions LLC, Ashburn, VA (US)

(72) Inventors: Cynthia Lee Chambers, Ashburn, VA (US); Steven James Frederickson, Leesburg, VA (US)

(73) Assignee: IMDSS Solutions LLC, Ashburn, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/990,246

(22) Filed: Aug. 11, 2020

(65) Prior Publication Data

US 2020/0367685 A1 Nov. 26, 2020

Related U.S. Application Data

(63) Continuation of application No. 16/449,933, filed on Jun. 24, 2019, now Pat. No. 10,736,451, which is a (Continued)

(51) Int. Cl.
*A47G 29/14* (2006.01)
*G06Q 10/08* (2012.01)
*G07C 9/00* (2020.01)

(52) U.S. Cl.
CPC ....... *A47G 29/141* (2013.01); *G06Q 10/0833* (2013.01); *G06Q 10/0836* (2013.01);
(Continued)

(58) Field of Classification Search
CPC .................................................. A47G 29/141
See application file for complete search history.

(56) References Cited

U.S. PATENT DOCUMENTS 5,476,220 A 12/1995 Cohoon
5,509,603 A 4/1996 Hering
(Continued)

FOREIGN PATENT DOCUMENTS

AU 2004100832 A4 11/2004
CN 102949074 A 3/2013
WO 2014137617 A1 9/2014

*Primary Examiner* — K. Wong
(74) *Attorney, Agent, or Firm* — BakerHostetler

(57) ABSTRACT

A system for securely depositing an item includes: a deposit box with a door configured to provide selective access to an interior space in the deposit box; a lock mechanism configured to attach to the deposit box to selectively block the door from opening; a first proximity sensor operatively connected to the lock mechanism to operate the lock mechanism to block the door or allow the door to open; a second proximity sensor configured to be attached to at least one of: a delivery person and a piece of delivery equipment; a third proximity sensor; and a first transmitter operatively connected to the lock mechanism and configured to transmit a signal indicative of operating information regarding the lock mechanism, and wherein the deposit box is at least 18 inches wide and 24 inches long.

23 Claims, 10 Drawing Sheets

Related U.S. Application Data continuation of application No. PCT/IB2017/058377, filed on Dec. 22, 2017, which is a continuation-in-part of application No. 15/389,867, filed on Dec. 23, 2016, now Pat. No. 10,039,400, and a continuation-in-part of application No. 15/479,525, filed on Apr. 5, 2017, now Pat. No. 10,512,353.

(60) Provisional application No. 62/563,762, filed on Sep. 27, 2017.

(52) U.S. Cl.
CPC .... *G07C 9/00309* (2013.01); *A47G 2029/145* (2013.01); *A47G 2029/149* (2013.01); *G07C 2009/00769* (2013.01)

(56) References Cited

U.S. PATENT DOCUMENTS

| | | |
|---|---|---|
| 6,987,452 B2 | 1/2006 | Yang |
| 7,931,189 B2 | 4/2011 | Kalenburg |
| 8,339,261 B1 | 12/2012 | Wolski |
| 8,643,511 B1 | 2/2014 | Batterson |
| 9,619,955 B2 | 4/2017 | Eichenblatt |
| 10,736,451 B2 * | 8/2020 | Chambers ............ A47G 29/141 |
| 2002/0005774 A1 | 1/2002 | Rudolph et al. |
| 2003/0061395 A1 | 3/2003 | Kingsbury et al. |
| 2007/0257772 A1 | 11/2007 | Marcelle et al. |
| 2008/0121682 A1 | 5/2008 | Grim et al. |
| 2014/0138440 A1 | 5/2014 | D'Ambrosio et al. |
| 2014/0197730 A1 | 7/2014 | Spence et al. |
| 2015/0186840 A1 | 7/2015 | Torres et al. |
| 2016/0180618 A1 | 6/2016 | Ho et al. |
| 2016/0335822 A1 | 11/2016 | Ogishi et al. |

* cited by examiner

INTEGRATED PACKAGE AND MAIL SECURITY SYSTEM IMPLEMENTING ENRICHED CUSTOMER AND DELIVERY SERVICE CAPABILITIES

CROSS-REFERENCE TO RELATED APPLICATIONS

This application is a continuation of U.S. patent application Ser. No. 16/449,933, filed Jun. 24, 2019, now U.S. Pat. No. 10,736,451, issued Aug. 11, 2020, which application is a continuation of International Application No. PCT/IB2017/058377, filed Dec. 22, 2017 designating the U.S., which claims priority to U.S. patent application Ser. No. 15/389,867, filed Dec. 23, 2016; claims priority to U.S. patent application Ser. No. 15/479,525, filed Apr. 5, 2017; and claims priority to U.S. patent application Ser. No. 62/563,762, filed Sep. 27, 2017 the disclosures of which are hereby incorporated by reference in their entirety.

TECHNICAL FIELD

The present disclosure relates generally to a system and method for securely delivering packages and correspondence. More particularly, the present disclosure relates to a system and method for limiting access to a secured delivery box to a delivery person and a system user associated with the delivery box. Moreover, the present disclosure provides an integrated package and mail security system implementing enriched customer and delivery service capabilities.

BACKGROUND

Everyday delivery services deliver sensitive mail to over 155 million delivery locations, most of which are filled with unsecured, or minimally secured, public access mailboxes. Every day, sensitive, personal data is left unattended in these publically accessible mailboxes, with no or little security. The mailboxes even have raised red flags to publicize to criminals that personal, valuable data could be sitting in these unsecured boxes waiting to be taken. This security weakness has been inherent in the mail and package delivery model since the inception of the mail delivery system.

Furthermore, modern delivery services often have excellent tracking systems to track where mail, packages or other things to be delivered are in the delivery system. However most or all these systems lack the ability to actually track if mail or packages are located in a mailbox or other deposit type receptacle.

Accordingly, it is desirable to provide a system or method and apparatus that can allow mail, packages, or other items that are delivered to be deposited in a more secure location and allow tracking of whether the item is deposited within the mailbox or other deposit receptacle.

SUMMARY

The present disclosure describes a system for securely depositing an item including: a deposit box having walls, a floor, and top that defines an interior space within the deposit box and a door configured to provide selective access between the interior space in the deposit box and an exterior of the deposit box; a lock mechanism configured to attach to the deposit box to selectively block the door from opening; a first proximity sensor operatively connected to the lock mechanism to operate the lock mechanism to block the door or allow the door to open; a second proximity sensor configured to be attached to at least one of: a delivery person and a piece of delivery equipment; a third proximity sensor; and a first transmitter operatively connected to the lock mechanism and configured to transmit a signal indicative of operating information regarding the lock mechanism, and wherein the deposit box is at least 18 inches wide and 24 inches long.

The present disclosure also describes, a method of making a secure delivery including: unlocking a delivery box by activating a first proximity sensor operatively connected to a lock mechanism by moving a second proximity sensor near the first proximity sensor, wherein the second proximity sensor is mounted to a piece of delivery equipment, wherein the first and second proximity sensors have been registered to a delivery box user and a delivery service respectively; depositing a delivery item associated with the delivery box in the delivery box or in a bag associated with the delivery box; and moving the second proximity sensor away from the first proximity sensor, and wherein the delivery box is at least 18 inches wide and 24 inches long.

The present disclosure also describes, a system for securely depositing an item including: a deposit box having walls, a floor, and top that defines an interior space within the deposit box and a door configured to provide selective access between the interior space in the deposit box and an exterior of the deposit box; a lock mechanism configured to attach to the deposit box to selectively block the door from opening; a first proximity sensor operatively connected to the lock mechanism to operate the lock mechanism to block the door or allow the door to open; a second proximity sensor configured to be attached to at least one of: a delivery person and a piece of delivery equipment; a third proximity sensor; a first transmitter operatively connected to the lock mechanism and configured to transmit a signal indicative of operating information regarding the lock mechanism; a bag, the bag having an attaching member configured to attach to a securing member located in the interior space; and a passageway in the deposit box sized and dimensioned to allow the attaching member to pass through the passageway to attach to the securing member in the interior space when the bag is outside of the interior space.

DETAILED DESCRIPTION

Figure 1:
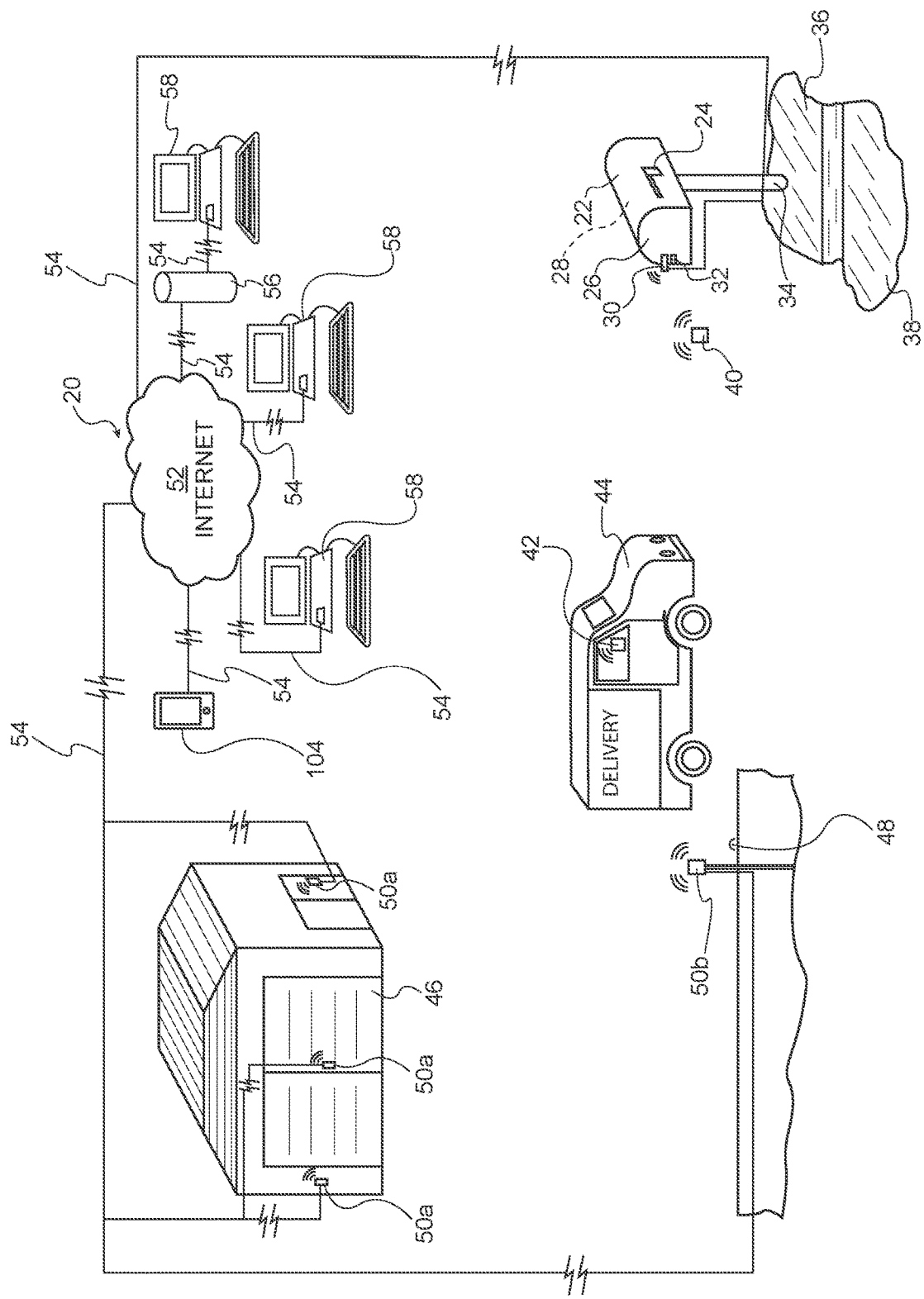
FIG. 1 is a schematic diagram of a system for depositing delivery items in a secure manner and tracking whether the item has been deposited in the receptacle in accordance with the present disclosure.

An example, non-limiting aspect in accordance with the invention will now be described with reference to the drawing figures, in which like reference numerals refer to like parts throughout. It should be understood that the drawings are not to scale. An aspect in accordance with the present disclosure provides a system, method, or apparatus that that can allow mail or other items that are delivered to be deposited in a secure location and allow tracking of whether the item is deposited in the mailbox or other deposit receptacle.

An aspect of the present inventive system is schematically shown in FIG. 1. FIG. 1 illustrates a system 20 that allows an item to be delivered in a relatively secure location and that item to be tracked as well as the status of the deposit box being monitored.

As shown in FIG. 1, a deposit box 22 may include an indicator 24 such as a flag 24 to indicate to a delivery person whether there is an item in the deposit box 22 to be picked up. The deposit box 22 may include a door 26 that provides selective access to an enclosed space 28 located within the deposit box 22. The deposit box 22 may be made of steel, aluminum, or any other metal, metal alloy, plastic, resin, polymer, fiberglass or other suitable substance. The deposit box 22 may include a box proximity sensor 30 which may be operatively connected to a locking mechanism 32. The deposit box 22 may be mounted upon a box support 34 which may be mounted to or set in the ground 36. The deposit box 22 may be located adjacent to a street or road 38.

In some aspects, the box proximity sensor 30 is able to detect if another appropriately authorized proximity sensor 40, 42 is nearby. If an appropriately authorized sensor 40 or 42 is near the box proximity sensor 30, then the box proximity sensor 30 can send a control signal to the locking mechanism 32 to unlock which will allow the door 26 to be opened to provide access to the enclosed space 28. The box proximity sensor 30 may also have a transceiver that allows the box proximity sensor 30 to send/receive signals to and from the system 20. Furthermore, when there are no authorized proximity sensors 40 or 42 near the box proximity sensor 30, then the locking mechanism 32 will move to its defaulted, locked state.

The system 20 may include a piece of delivery equipment 44. As shown in FIG. 1, the delivery equipment 44 is a delivery vehicle. The delivery vehicle 44 may be equipped with an authorized proximity sensor 42 which may communicate with the box proximity sensor 30 when the authorized proximity sensor 42 is located near the box proximity sensor 30. As a result, a delivery person operating the delivery vehicle 44 need only drive or maneuver the delivery vehicle 44 near the deposit box 22 to cause the deposit box 22 to be in an unlocked state. The delivery person need not fumble with keys or any other devices in order to unlock the deposit box 22. Rather, merely maneuvering the delivery equipment 44 (which is shown in FIG. 1 to be a vehicle, but other delivery equipment may also be used which will be discussed later below) near the deposit box 22 unlocks the deposit box 22. Further, moving the delivery equipment 44 away from the deposit box 22 will cause the deposit box 22 to be a locked state. Therefore, the delivery person need not perform any extra function to lock or unlock the deposit box 22 other than what the delivery person would already do when making a deposit within a regular non-secured deposit box.

When a user such as the owner or other person associated with the deposit box 22 wants to access the deposit box 22 to retrieve a piece of mail, package, or other article, the user may use the user's proximity sensor 40 and bring it near the box proximity sensor 30 causing the box proximity sensor 30 to send a signal to the locking mechanism 32 to unlock and allow the door 26 of the deposit box 22 to open to thereby provide access to the enclosed space 28. When the user moves away from the deposit box 22 the user's proximity sensor 40 will move out of range and no longer be able to communicate with the box proximity sensor 30, which will cause the locking mechanism 32 to move to its default locking position.

In some aspects, and as shown in FIG. 1, a delivery operation may have a home base 46, which may be a place, or building where the equipment 44 may be stored and/or loaded with items to be delivered. In some aspects, this may be a local or regional post office.

The base or building 46 may be associated with a boundary or property line 48. In some aspects, when the delivery vehicle 44 leaves the building 46 building proximity sensors 50A detects when the proximity sensor 42 on the delivery vehicle 44 leaves the building 46. In other aspects, a boundary line proximity sensor 50B can detect when the proximity sensor 42 on the delivery vehicle 44 leaves the property boundary 48.

When the proximity sensors 50A or 50B detect that the delivery proximity sensor 42 has left either the building 46 or the property boundary 48 they may send a signal via connectors 54, which may be wired, or wireless through the Internet 52 or other communications system to a server or database 56. The server or database 56 can save data regarding the movement of the proximity sensor 42. In this way, the date and time of when the proximity sensor 42 left the base 46 or property 48 may be monitored and stored. Conventional or other delivery tracking systems may be used to generate information and/or data to be stored on the server or database 56 so that the delivery proximity sensor 42 may be associated with data such as which delivery articles are located on the delivery vehicle 44. In some aspects, signals may be sent to a user to indicate that a delivery article associated with a user has left the delivery facility 46 or property 48 and is out for delivery.

Users of the system 20 may use various computers (PCs) 58 which may be connected either wirelessly are wired by connections 54 through the Internet 52 or other communications system to the database or server 56 in order to retrieve data is saved on the server 56 or to receive signals, emails, texts or other messages providing them updates with respect to items to be delivered to their delivery receptacles 22.

In addition to various computers personal computers (PCs) 58, users may access the system 20 using a wireless device 104. The wireless device 104 may also be connected via a wired or wireless connection 54 to the Internet 52 or other communication systems to the database or server 56. It should be understood that the various proximity sensors 30, 40, 42, 50A, and 50B may include transceivers which allow the proximity sensors 30, 40, 42, 50A and 50B to communicate with other aspects of the system 20 such as the server/database 56. It should be understood that none, some, or all of the access, communication, and data storage that occurs over the system 20 is securely protected and may be encrypted.

Figure 2:
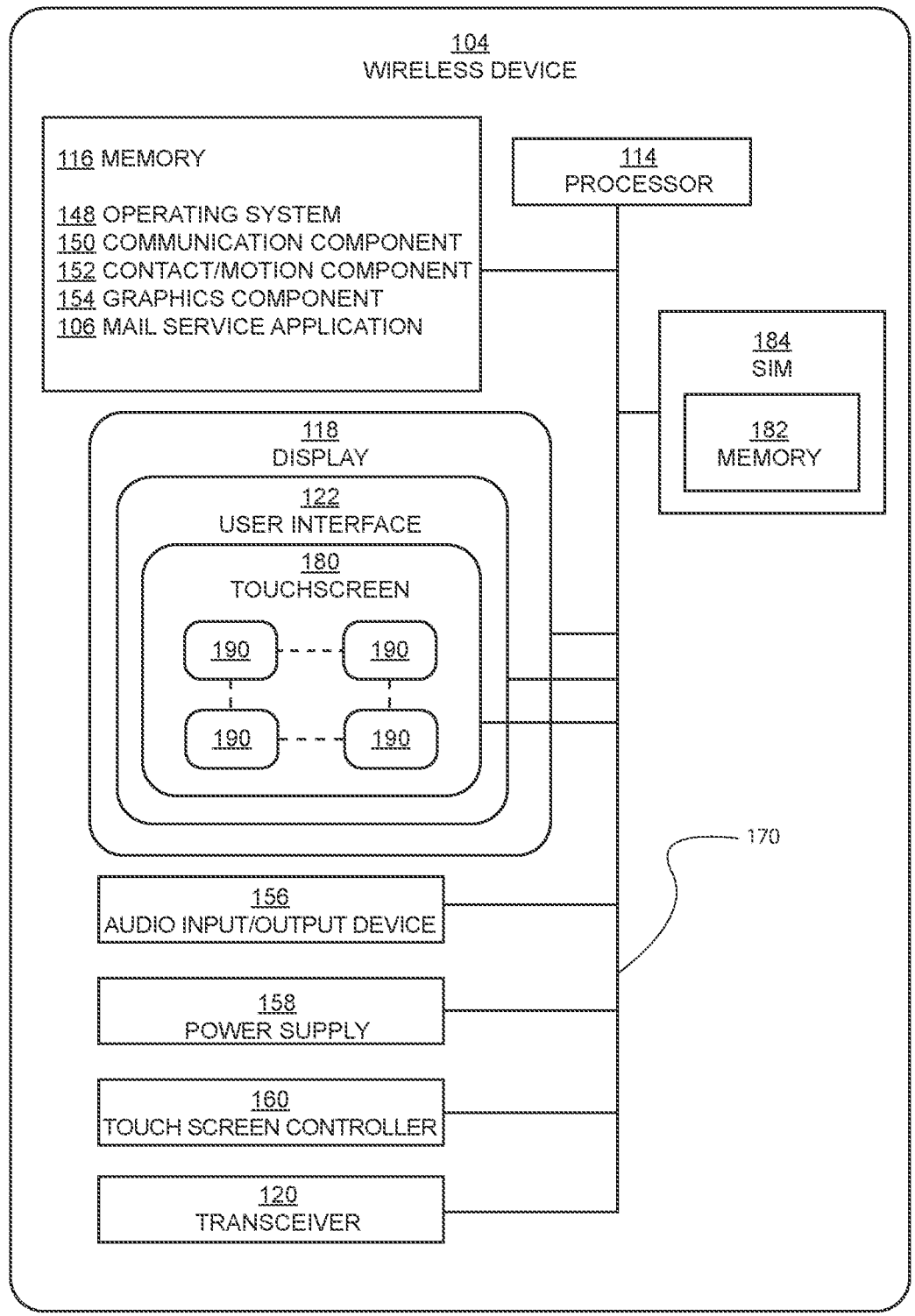
FIG. 2 is a schematic drawing of a wireless device that may be used with the system of FIG. 1.

FIG. 2 illustrates a device 104 in accordance with an aspect of the disclosure. In this regard, the disclosure may be implemented in conjunction with a wireless device 104 executing the mail service optimization application 106. The wireless device 104 includes a memory 116. The wireless device 104 may further include an operating system 148, a communication component 150, a contact/motion component 152, a graphics component 154, and the like. The operating system 148 together with the various components provides software functionality for each of the components of the wireless device 104. The memory 116 may include a high-speed, random-access memory. Also, the memory 116 may be a non-volatile memory, such as magnetic fixed disk storage, flash memory or the like. These various components may be connected through various communication lines including a data bus 170. The memory 116 may also store device related information including but not limited to a device serial number, such as, for example, an International Mobile Equipment Identify (IMEI), an Electronic Serial Number (ESN), Mobile Equipment Identifier (MEID), and/or the like.

In another aspect of the disclosure, the memory 116 of a wireless device 104 includes a database for storing user information. The user information may include further information as required by the service provider and may include information such as full name, address, date of birth, telephone number, service provider, email address, contact number, credit card information, and the like. In one aspect, the database may include security questions. In another aspect, the database may include user specified preferences.

The wireless device 104 may also include a SIM card 184 having a memory 182. The memory 182 stores the SIM card serial number, and may be implemented as, for example, an integrated Circuit Card ID (ICCID). Aspects of the disclosure may be equally applicable to wireless devices 104 that are implemented without a SIM card 184 having a memory 182.

The wireless device 104 also includes a processor 114 which may be a central processing unit configured to execute instructions, such as, for example, instructions related to software programs. Any processor can be used for the wireless device 104 as understood by those of ordinary skill in the art. The processor 114 may be coupled to the user interface 122, the SIM card 184, and the memory 116. The display 118 may be a liquid crystal display (LCD) or any other suitable display. Preferably, the LCD includes a backlight to illuminate the various color liquid crystals to provide a more colorful display. The user interface 122 may be any type of physical input as readily employed in the field. For example, the user interface may have physical buttons. Alternatively, the user interface may be implemented on a touchscreen 180. Additionally, the wireless device 104 includes a power supply 158. The mail service optimization application 106 may be executed by the processor 114.

The wireless device 104 may include an audio input/output device 156. The audio input/output device 156 may include speakers, speaker outputs, microphones, microphone inputs, and the like, for receiving and sending sound inputs. In an exemplary aspect, the audio input/output device 156 may include an analog to digital converter and a digital to analog converter for audio input and output functions respectively.

In a further aspect, the wireless device 104 may include a transceiver 120. The wireless device 104 may provide radio and signal processing as needed to access a network for services in conjunction with the transceiver 120. The processor 114 may be configured to process call functions, data transfer, and the like and provide other services to the user.

In an exemplary aspect, the touchscreen 180 of the disclosure may be implemented in the display 118 and may detect a presence and location of a touch of a user within the display area. For example, touching the display 118 of the wireless device 104 with a finger or hand. The touchscreen 180 may also sense other passive objects, such as a stylus. The wireless device 104 may further include a touch screen controller 160.

In operation, the display 118 may show various objects 190 associated with applications for execution by the processor 114. For example, a user may touch the display 118, particularly the touchscreen 180, to interact with the objects 190. That is, touching an object 190 may execute an application in the processor 114 associated with the object 190 that is stored in memory 116. Additionally or alternatively, touching an object 190 may open a menu of options to be selected by the user. The display 118 may include a plurality of objects 190 for the user to interact with. Moreover, the display 118 may include a plurality of screens. The display 118 showing one screen at a time. The user may interact with the display 118 to move a screen into view on the display 118. Various objects 190 may be located in each of the screens.

The touchscreen 180 may have different implementations. The touchscreen 180 may be implemented as a resistive touchscreen, a surface acoustic wave touch screen, a capacitive touch screen, a surface capacitance touchscreen, projected capacitive touch screen, self-capacitance sensors, infrared sensors, dispersive signal technology, acoustic pulse recognition, or the like.

The display 118 is generally configured to display a graphical user interface (GUI) 122 that provides an easy to use visual interface between a user of the wireless device 104 and the operating system or application(s) running on the wireless device 104. Generally, the GUI presents programs, files, and operational options with graphical images. During operation, the user may select and activate various graphical images, which appear on the display 118 in order to initiate functions and tasks associated therewith.

Any of the computers 58 may include all, some, or any other desirable features described above with respect to the wireless device 104. In some aspects, programs or applications (apps) may be downloaded from the server or database 56 onto the wireless devices or computers 58 in order to allow a user to easily access information regarding the system 20. Alternatively, the programs or applications may reside or the database or server 56 and be accessed by a user via a wireless device 104 or computer 58.

Any of the wired or wireless connections 54, or other communication aspects of the disclosure, may include communication channels that may be any type of wired or wireless electronic communications network, such as, e.g., a wired/wireless local area network (LAN), a wired/wireless personal area network (PAN), a wired/wireless home area network (HAN), a wired/wireless wide area network (WAN), a campus network, a metropolitan network, an enterprise private network, a virtual private network (VPN), an internetwork, a backbone network (BBN), a global area network (GAN), the Internet, an intranet, an extranet, an overlay network, Near field communication (NFC), a cellular telephone network, a Personal Communications Service (PCS), using known protocols such as the Global System for Mobile Communications (GSM), CDMA (Code-Division Multiple Access), GSM/EDGE and UMTS/HSPA network technologies, Long Term Evolution (LTE), 5G (5th generation mobile networks or 5th generation wireless systems), WiMAX, HSPA+, W-CDMA (Wideband Code-Division Multiple Access), CDMA2000 (also known as C2K or IMT Multi-Carrier (IMT-MC)), Wireless Fidelity (Wi-Fi), Bluetooth, and/or the like, and/or a combination of two or more thereof. The NFC standards cover communications protocols and data exchange formats, and are based on existing radio-frequency identification (RFID) standards including ISO/IEC 14443 and FeliCa. The standards include ISO/IEC 18092[3] and those defined by the NFC Forum.

Aspects of the disclosure may be implemented in any type of computing devices, such as, e.g., a desktop computer, personal computer, a laptop/mobile computer, a personal data assistant (PDA), a mobile phone, a tablet computer, cloud computing device, and the like, with wired/wireless communications capabilities via the communication channels.

Aspects of the disclosure may be web-based. For example, a server may operate a web application in conjunction with a database. The web application may be hosted in a browser-controlled environment (e.g., a Java applet and/or the like), coded in a browser-supported language (e.g., JavaScript combined with a browser-rendered markup language (e.g., Hyper Text Markup Language (HTML) and/or the like)) and/or the like such that any computer running a common web browser (e.g., Internet Explorer™, Firefox™, Chrome™, Safari™ or the like) may render the application executable. A web-based service may be more beneficial due to the ubiquity of web browsers and the convenience of using a web browser as a client (i.e., thin client). Further, with inherent support for cross-platform compatibility, the web application may be maintained and updated without distributing and installing software on each.

Aspects of the disclosure may be implemented in any type of mobile smartphones that are operated by any type of advanced mobile data processing and communication operating system, such as, e.g., an Apple™ iOS™ operating system, a Google™ Android™ operating system, a RIM™ Blackberry™ operating system, a Nokia™ Symbian™ operating system, a Microsoft™ Windows Mobile™ operating system, a Microsoft™ Windows Phone™ operating system, a Linux™ operating system or the like.

Further in accordance with various aspects of the disclosure, the methods described herein are intended for operation with dedicated hardware implementations including, but not limited to, PCs, PDAs, semiconductors, application specific integrated circuits (ASIC), programmable logic arrays, cloud computing devices, and other hardware devices constructed to implement the methods described herein.

It should also be noted that the software implementations of the disclosure as described herein are optionally stored on a tangible storage medium, such as: a magnetic medium such as a disk or tape; a magneto-optical or optical medium such as a disk; or a solid state medium such as a memory card or other package that houses one or more read-only (non-volatile) memories, random access memories, or other re-writable (volatile) memories. A digital file attachment to email or other self-contained information archive or set of archives is considered a distribution medium equivalent to a tangible storage medium. Accordingly, the disclosure is considered to include a tangible storage medium or distribution medium, as listed herein and including art-recognized equivalents and successor media, in which the software implementations herein are stored.

Additionally, the various aspects of the disclosure may be implemented in a non-generic computer implementation. Moreover, the various aspects of the disclosure set forth herein improve the functioning of the system as is apparent from the disclosure hereof. Furthermore, the various aspects of the disclosure involve computer hardware that it specifically programmed to solve the complex problem addressed by the disclosure. Accordingly, the various aspects of the disclosure improve the functioning of the system overall in its specific implementation to perform the process set forth by the disclosure and as defined by the claims.

According to an example, the global navigation satellite system (GNSS) may include a device and/or system that may estimate its location based, at least in part, on signals received from space vehicles (SVs). In particular, such a device and/or system may obtain "pseudorange" measurements including approximations of distances between associated SVs and a navigation satellite receiver. In a particular example, such a pseudorange may be determined at a receiver that is capable of processing signals from one or more SVs as part of a Satellite Positioning System (SPS). Such an SPS may comprise, for example, a Global Positioning System (GPS), Galileo, Glonass, to name a few, or any SPS developed in the future. To determine its location, a satellite navigation receiver may obtain pseudorange measurements to three or more satellites as well as their positions at time of transmitting. Knowing the SV orbital parameters, these positions can be calculated for any point in time. A pseudorange measurement may then be determined based, at least in part, on the time a signal travels from an SV to the receiver, multiplied by the speed of light. While techniques described herein may be provided as implementations of location determination in GPS and/or Galileo types of SPS as specific illustrations according to particular examples, it should be understood that these techniques may also apply to other types of SPS, and that claimed subject matter is not limited in this respect.

The application described in the disclosure may be implemented to execute on an Apple™ iOS™ operating system, a Google™ Android™ operating system, a RIM™ Blackberry™ operating system, a Nokia™ Symbian™ operating system, a Microsoft™ Windows Mobile™ operating system, a Microsoft™ Windows Phone™ operating system, a Linux™ operating system or the like. The application may be displayed as an icon. The application may have been downloaded from the Internet, pre-installed, or the like. In some aspects, the application may be obtained from Google Play™, Android Market™, Apple Store™, or the like digital distribution source. The application may be written in conjunction with the software developers kit (SDK) associated with an Apple™ iOS™ operating system, a Google™ Android™ operating system, a RIM™ Blackberry™ operating system, a Nokia™ Symbian™ operating system, a Microsoft™ Windows Mobile™ operating system, a Microsoft™ Windows Phone™ operating system, a Linux™ operating system or the like.

Aspects of the disclosure may include a server 56 executing an instance of an application or software configured to accept requests from a client and giving responses accordingly. The server 56 may run on any computer including dedicated computers. The computer may include at least one processing element, typically a central processing unit (CPU), and some form of memory. The processing element may carry out arithmetic and logic operations, and a sequencing and control unit may change the order of operations in response to stored information. The server 56 may include peripheral devices that may allow information to be retrieved from an external source, and the result of operations saved and retrieved. The server 56 may operate within a client-server architecture. The server 56 may perform some tasks on behalf of clients. The clients may connect to the server 56 through the network on a communication channel as defined herein. The server 56 may use memory with error detection and correction, redundant disks, redundant power supplies and so on.

The term text message or SMS refers to "short message service" which is a text messaging service component of phone, web, or mobile communication systems. It uses standardized communications protocols to allow fixed line or mobile phone devices to exchange short text messages. SMS was originally designed as part of GSM, but is now available on a wide range of networks, including 3G, 4G, LTE, 5G networks or networks associated with the communication channel as defined herein.

Multimedia Messaging Service (MMS) is a standard way to send messages that include multimedia content to and from mobile phones. It extends the core SMS (Short Message Service) capability that allowed exchange of text messages only up to 160 characters in length. While the most popular use is to send photographs from camera-equipped handsets, it is also used as a method of delivering news and entertainment content including videos, pictures, text pages, and ringtones. MMS can be used within the context of the present invention for UICC activation message delivery. Of note is that MMS messages are delivered in a completely different way from SMS. The first step is for the sending device to encode the multimedia content in a fashion similar to sending a MIME e-mail (MIME content formats are defined in the MMS Message Encapsulation specification). The message is then forwarded to the carrier's MMS store and forward server, known as the MMSC (Multimedia Messaging Service Centre). If the receiver is on another carrier, the relay forwards the message to the recipient's carrier using the Internet 52.

Figure 3:
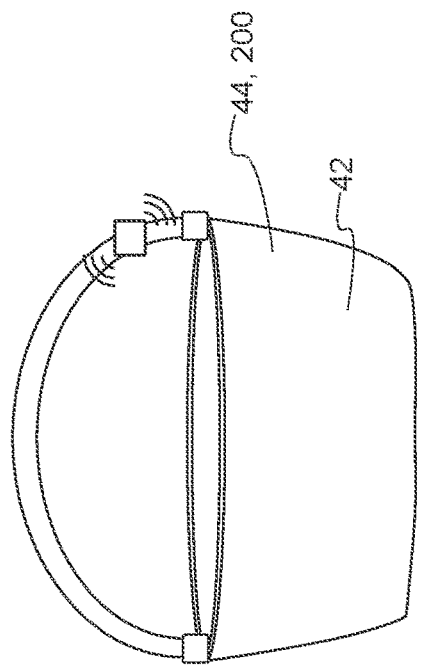
FIG. 3 is a front view of a mailbag that may be used in accordance to the system of FIG. 1.

FIG. 3 illustrates another aspect where the delivery equipment 44 is not a vehicle as shown in FIG. 1 but is rather a mail carrier's bag 200. The bag 200 is equipped with a delivery the proximity sensor 42 and operates in the same manner as the delivery proximity sensor 42 described in FIG. 1. In other words, all the delivery person needs to do is to approach the deposit box 22 and the delivery proximity sensor 42 will communicate with the box proximity sensor 30 cause the deposit box 22 to unlock. By walking away from the deposit box 22 the delivery proximity sensor 42 will no longer be proximate to the box proximity sensor 30, which will cause the locking mechanism 32 to default to its locking position. It should be understood that in some aspects, that in order for the locking mechanism 32 to move to its defaulted, locked position, the door 26 must be closed.

Figure 4:
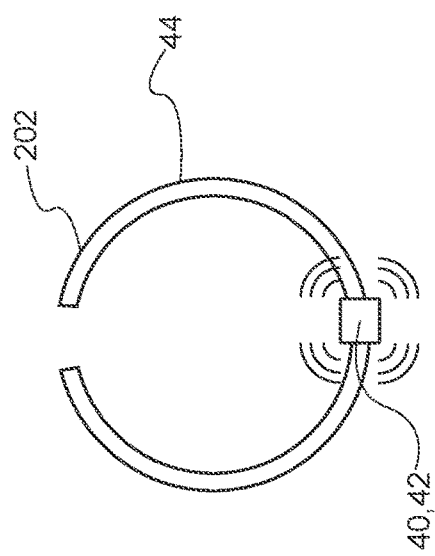
FIG. 4 is a top view of a necklace or bracelet containing a proximity sensor that may be used in accordance with the system of FIG. 1.
Figure 6:
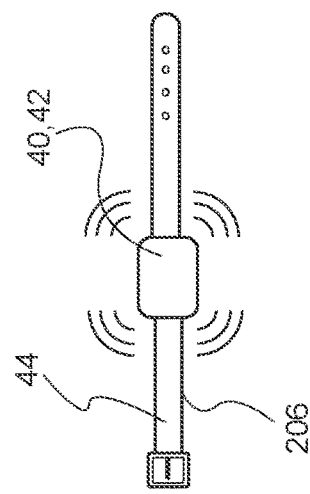
FIG. 6 is a top view of a watch containing a proximity sensor that may be used in accordance with the system of FIG. 1.
Figure 5:
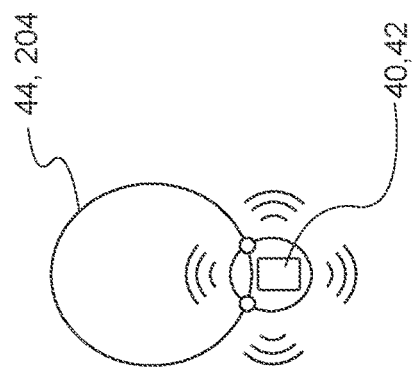
FIG. 5 is a top view of a key chain containing a proximity sensor that may be used in accordance with the system of FIG. 1.

FIGS. 4-6 illustrate various features that may be used by either a user or a delivery person to hold either the user's proximity sensor 40 or the delivery proximity sensor 42. As shown in FIG. 4, a necklace or bracelet 202 may act as the postal equipment 44 to hold the delivery proximity sensor 42. The bracelet or necklace 202 may be worn by the delivery person. In other aspects, the necklace or bracelet 202 can be used or worn by the user and contain the user's proximity sensor 40.

As shown in FIG. 5, a key ring 204 may act as the postal equipment 44 to hold the delivery proximity sensor 42. The key ring 204 may be carried by the delivery person. In some aspects, a key ring 204 can be used or carried by the user and contain the user's proximity sensor 40.

As shown in FIG. 6, a watch 206 may act as the postal equipment 44 to hold the delivery proximity sensor 42. The watch 206 may be worn by the delivery person. In some aspects, a watch 206 can be used or worn by the user and contain the user's proximity sensor 40.

Figure 7:
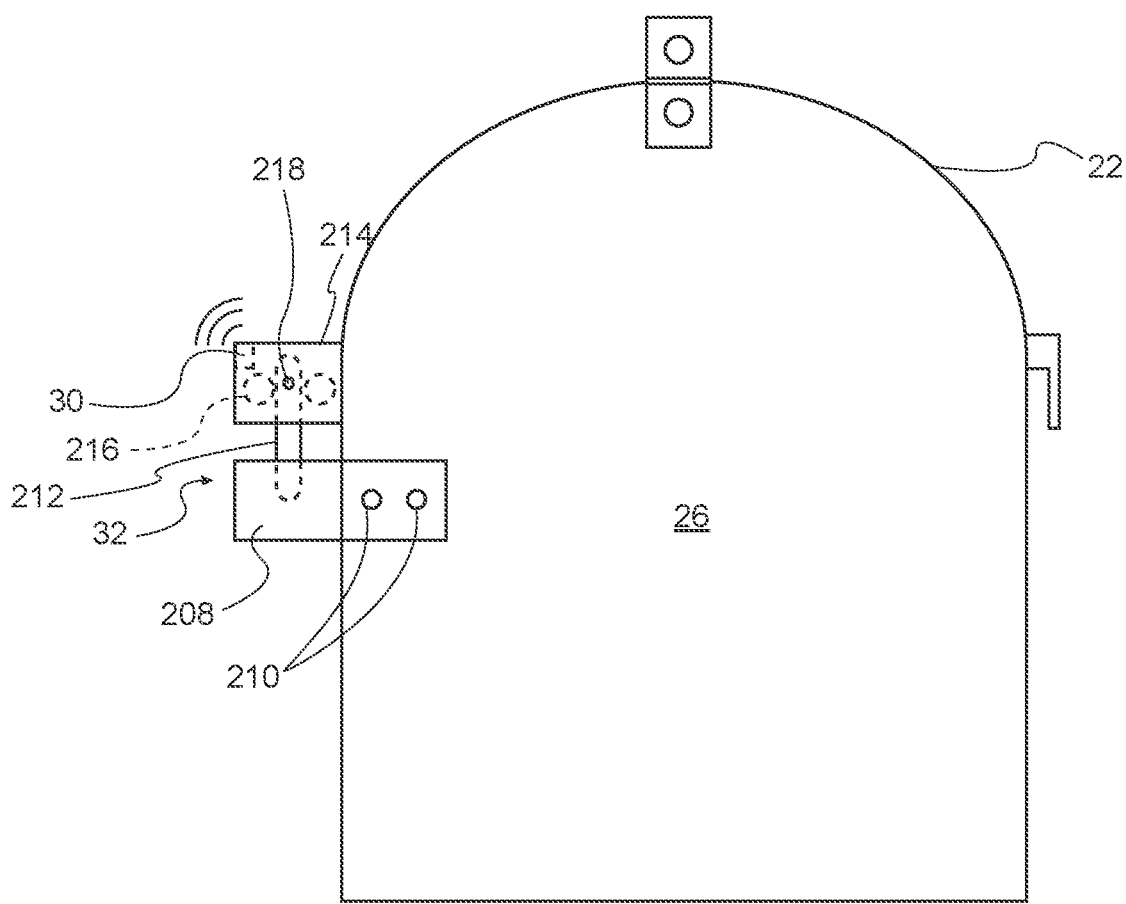
FIG. 7 is a front view of a mailbox having an external locking system.
Figure 8:
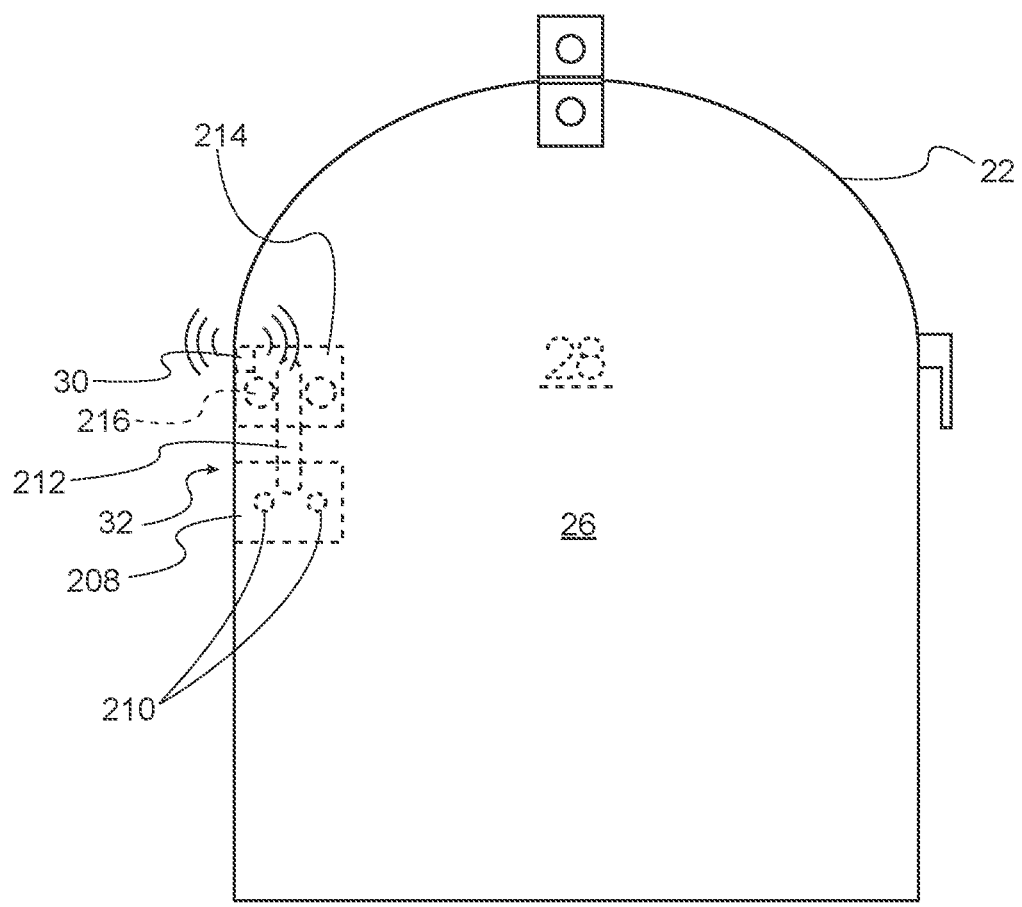
FIG. 8 is a front view of a mailbox having an internal locking system.

FIG. 7 is a front view of a deposit box 22 in accordance with the present disclosure. The locking mechanism 32 of FIG. 7 is shown external to the deposit box 22. FIG. 8 is another aspect where the locking mechanism 32 shown internally and in the enclosed space 28 of the deposit box 22. While the position of the locking mechanism 32 is shown herein as an example it will be understood that various different locking mechanism 32 may be employed and located at various positions and are on or in the deposit box 22.

With reference to FIGS. 7 and 8, the locking mechanism 32 includes a lock receiver 208, which is attached to the door 26 via fasteners 210. In other aspects, an adhesive, such as a high strength adhesive, may be used instead of, or in addition to, the fasteners 210 to attach the locking mechanism 32 to the deposit box 22. The lock receiver 208 receives a movable bolt 212. The movable bolt 212 retracts and extends in and out of the lock body 214 via a bolt moving mechanism 216. The locking mechanism 32 may be dimensioned so that when the door 26 is in a closed position the movable bolt 212 will fit into a recess within the lock receiver 208. A box proximity sensor 30 is operatively connected to the locking mechanism 32. The box proximity sensor 30 sends a signal to operate the locking mechanism 32 to move the movable bolt 212 position within the lock body 214 when the box proximity sensor 30 detects another authorized proximity sensor nearby. When no additional authorized proximity sensor is detected by the box proximity sensor 30, then the locking mechanism 32 will revert to its defaulted locked position. In other aspects, the default position of the locking mechanism 32 may be an unlocked position.

The locking mechanism 32 may also include a status light 218 which, in some aspects, may be an LED light. The status light 218 may display various colors or simply be illuminated or not to indicate the locking mechanism 32 status. In some aspects, when the locking mechanism 32 is not in a locked condition, the status light 218 may be not illuminated or illuminating a color indicating that the locking mechanism 32 is not locked. When the locking mechanism 32 is in a locked condition, then the status light 218 may be illuminated or display a color indicating that the locking mechanism 32 is in a locked condition. Power for the locking mechanism 32, the status light 218, and/or the proximity sensor 30 may include a battery, a connection to line voltage, a solar cell or any other suitable power source.

Figure 9:
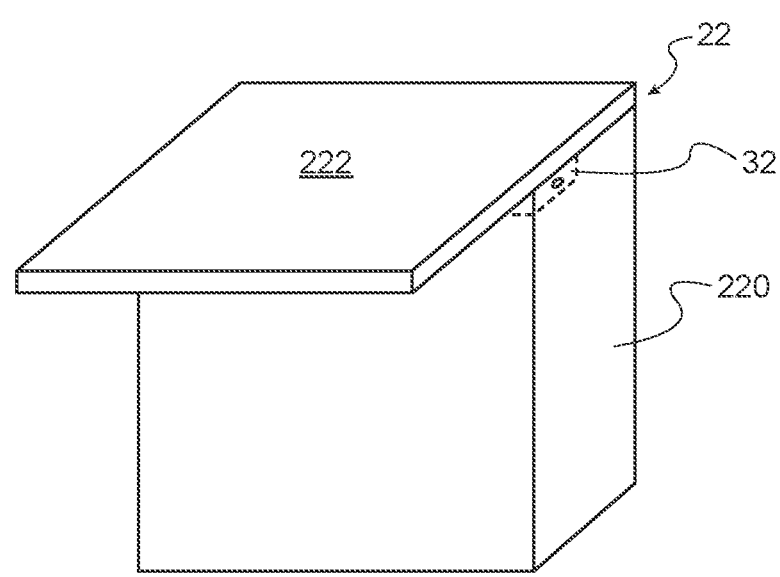
FIG. 9 is a perspective view of a larger deposit box having a locking system.

In some aspects, it may be desirable to have a large deposit box 220, which may be sized to accommodate larger packages and not just mail or other document deliveries as shown in FIG. 9. The large deposit box 220 may have a locking mechanism 32 secure the door 222 and a body of the large deposit box 220 in a similar manner as discussed above with respect to FIGS. 7 and 8. In some aspects, the larger deposit box 220 may be sized 18"×24." Other aspects may use different sizes. The large deposit box 220 may be attached directly to a user's home, the ground, or other building.

Figure 10A:
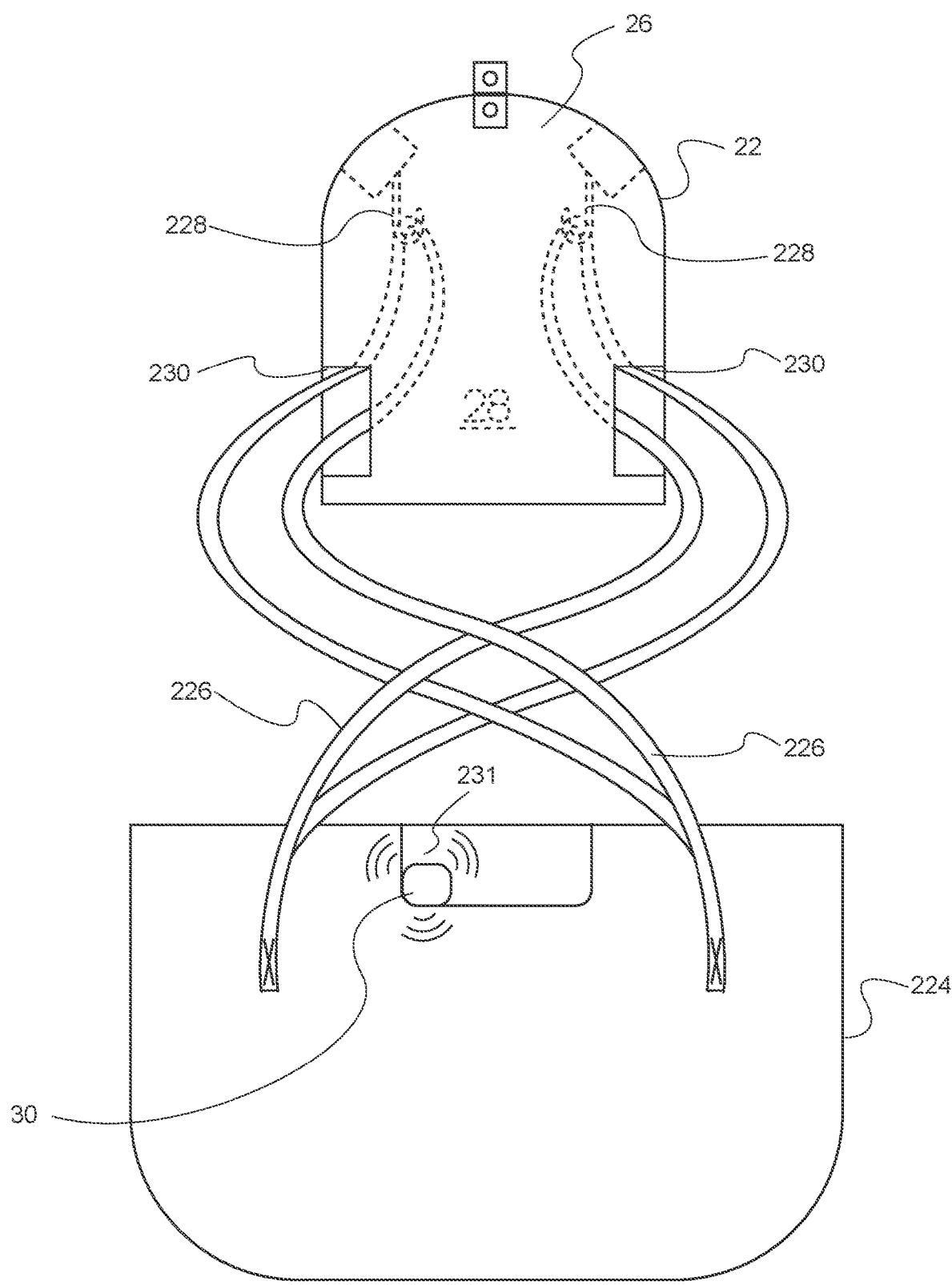
FIG. 10A is a front view of a deposit bag attached to a delivery box in accordance with the present disclosure.
Figure 10B:
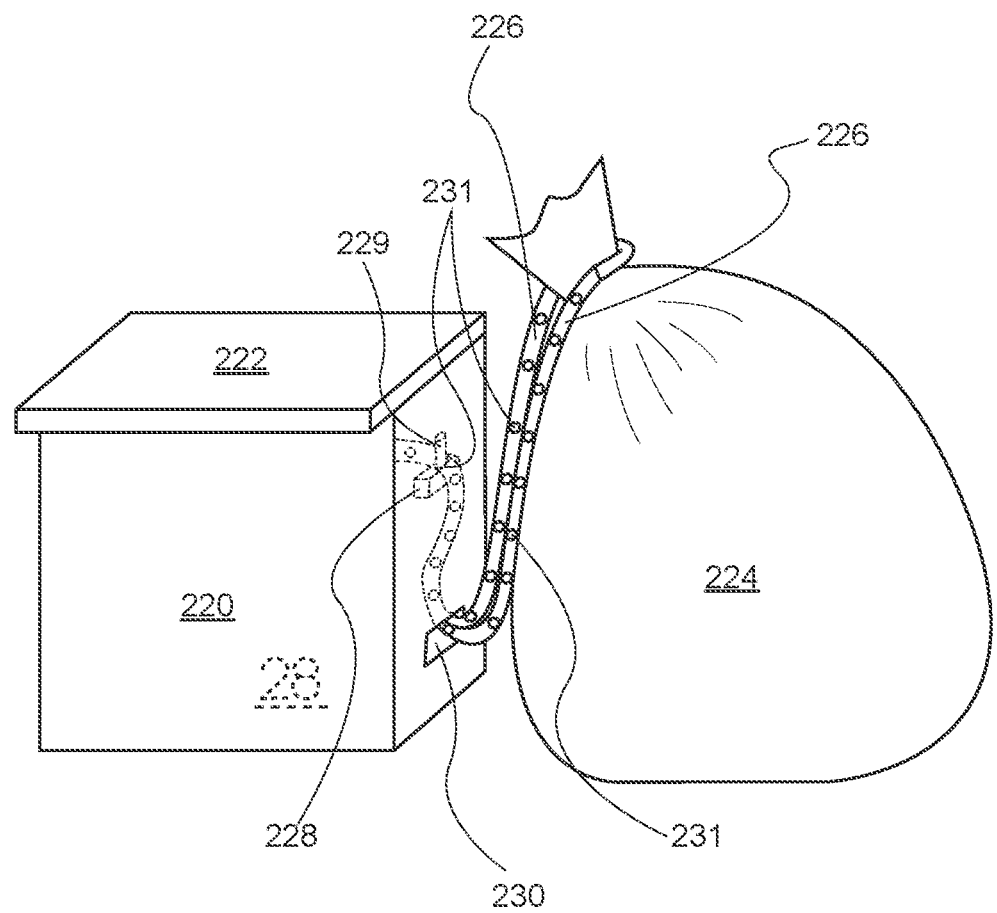
FIG. 10B is a perspective view of a larger deposit box having a deposit bag attached to a delivery box in accordance with the present disclosure.

FIGS. 10A and 10B illustrate additional aspects that may be used for delivering items larger than the deposit box 22 or 220. In the aspect illustrated in FIGS. 10A and 10B, the deposit box 22 or 220 may include a flexible deposit bag 224. The deposit bag 224 may assist in keeping a delivery protected from weather (particularly, but not limited to, precipitation, and ground moisture) as well as keeping the item secure. The deposit boxes 22, 220 may also be configured to protect delivery items from weather as well as keeping the item secure.

The flexible deposit bag 224 may be kept in the deposit box 22, 220 when not in use. There may be a slot or other structure in the deposit box 22, 220 or storing the deposit bag 224. The flexible deposit bag 224 may be made of a waterproof or water resistant nylon, plastic, canvas, or other suitable material. The bag 224 may be equipped with straps 226 which may fit through passageways 230 into the interior enclosed space 28 to fit on securing hooks (as shown in FIG. 10A) or other securing structure 228. In the aspect shown in FIG. 10B, the bag is cinched closed with the securing straps 226 and the securing straps 226 have holes which may fit over a post 229 which may be part of the securing structure 228. By using either of these ways, or any in other suitable manner, the bag 224 can be secured within the deposit box 22, 220. When the door 26, 222 of the deposit box 22 is opened, the straps 226 may be accessed to be removed from the securing structure 228 to provide access inside the bag 224. The item may be deposited in the bag 224 and the bag 224 cinched closed or otherwise closed. Then the securing straps 226 may be threaded through the passageways 230 and secured to the securing structure 228. The door 26, 222 may then be closed and the deposit box 22, 220 may be locked thereby securing, the bag 224 to the deposit box 22, 220.

It should be understood that the type of securing structure 228 shown in FIG. 10A may also be used with the deposit box 220 of FIGS. 9 and 10B. Furthermore, the securing structure 228 of FIG. 10B may also be used with the smaller deposit box 22. The illustrated aspects are exemplary and are not limiting. Various aspects of various aspects may be mixed and matched among various aspects.

In some aspects, the bag 224 may be designed so it is difficult to open without removing the securing straps 226 from the securing structure 228. In other aspects, a separate locking mechanism 231 may be attached to the deposit bag 224 to keep the bag 224 closed. Where a separate locking mechanism 231 is used, a proximity sensor 30 (similar to the proximity sensors described above) may also be operatively connected to the locking mechanism 231 to provide selective access to the bag 224, so that the locking mechanism 231 may be accessed by a delivery person or user in a similar manner to the locking and unlocking of the deposit box 22, 220 that is described elsewhere herein.

It will be understood that deposit boxes 22, 220 in accordance with the present disclosure may be originally configured to have any or all the features of: the box proximity sensor 30, the locking mechanism 32, the bag 224, and passageways 230 or may be modified to have any or all these features. In some aspects, kits may be provided to modify a standard mailbox or other structured to become a deposit box 22, 220 in accordance with present disclosure. Such a kit may include any or all of the following: the box proximity sensor 30, the locking mechanism 32, and the bag 224, fasteners 210 and/or an adhesive.

Figure 11:
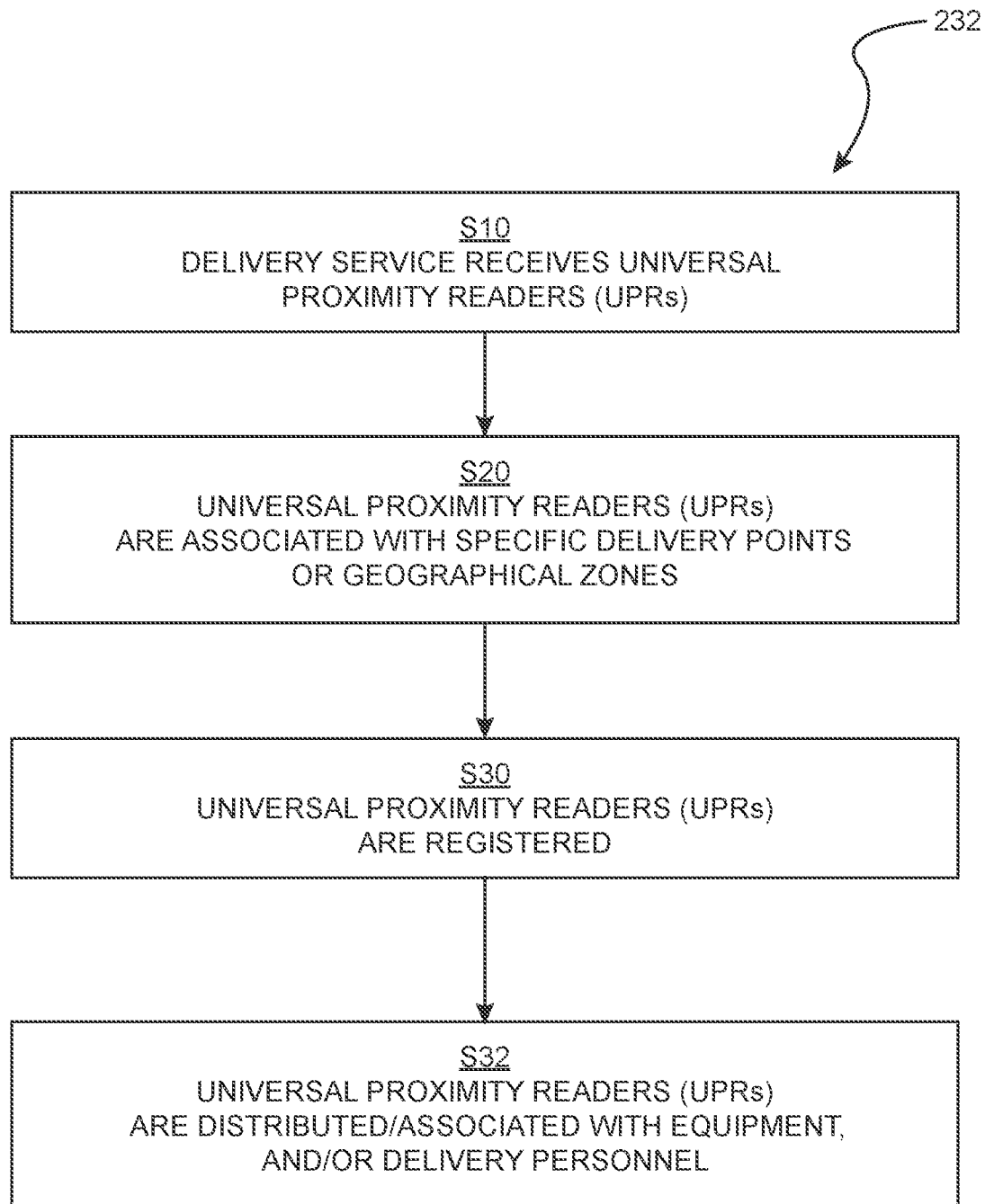
FIG. 11 is a flowchart illustrating a method of activating a universal proximity sensor in accordance with the present disclosure.
Figure 12:
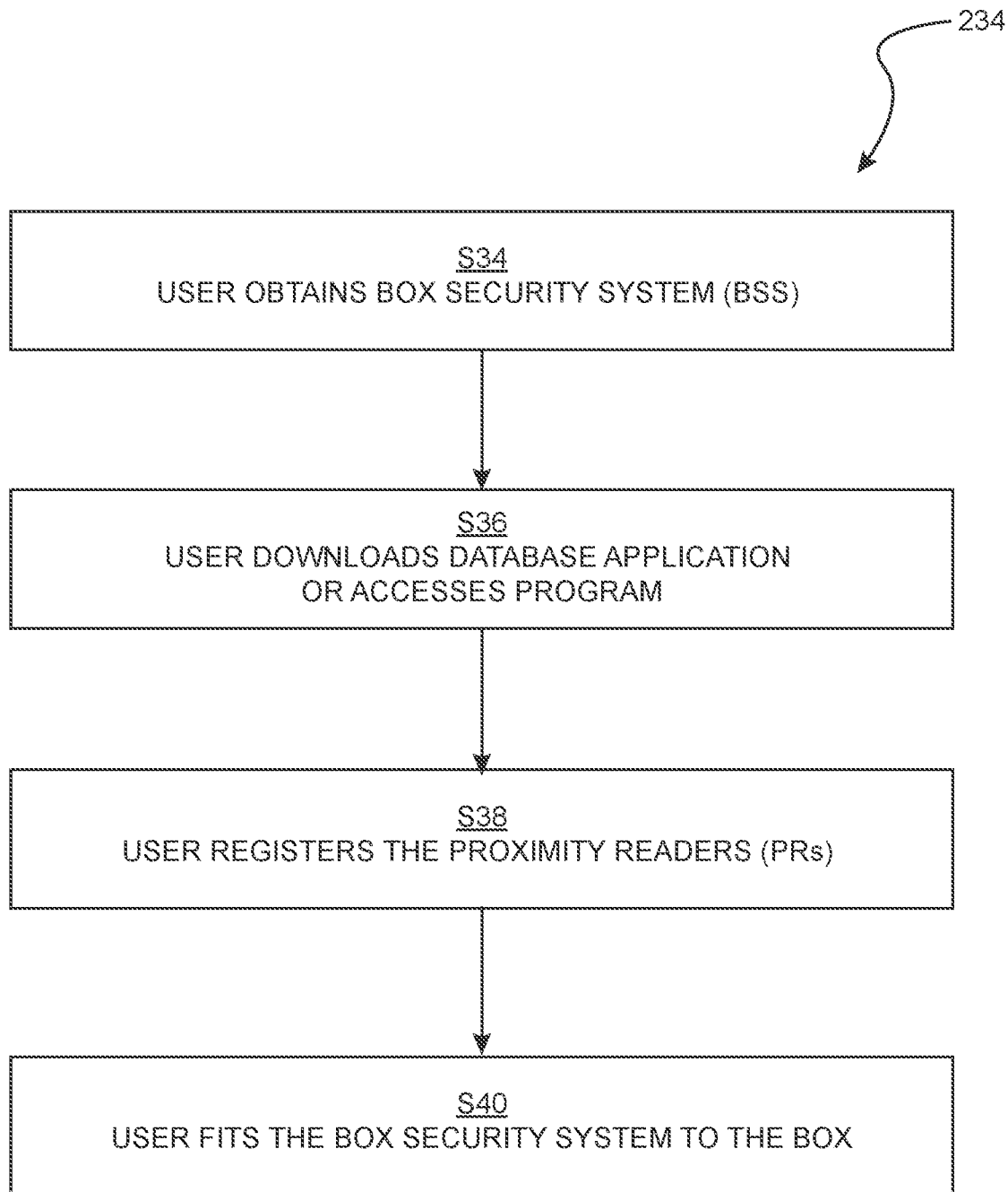
FIG. 12 is a flowchart illustrating a method of activating a proximity sensor attached to a deposit box in accordance with present disclosure.
Figure 13:
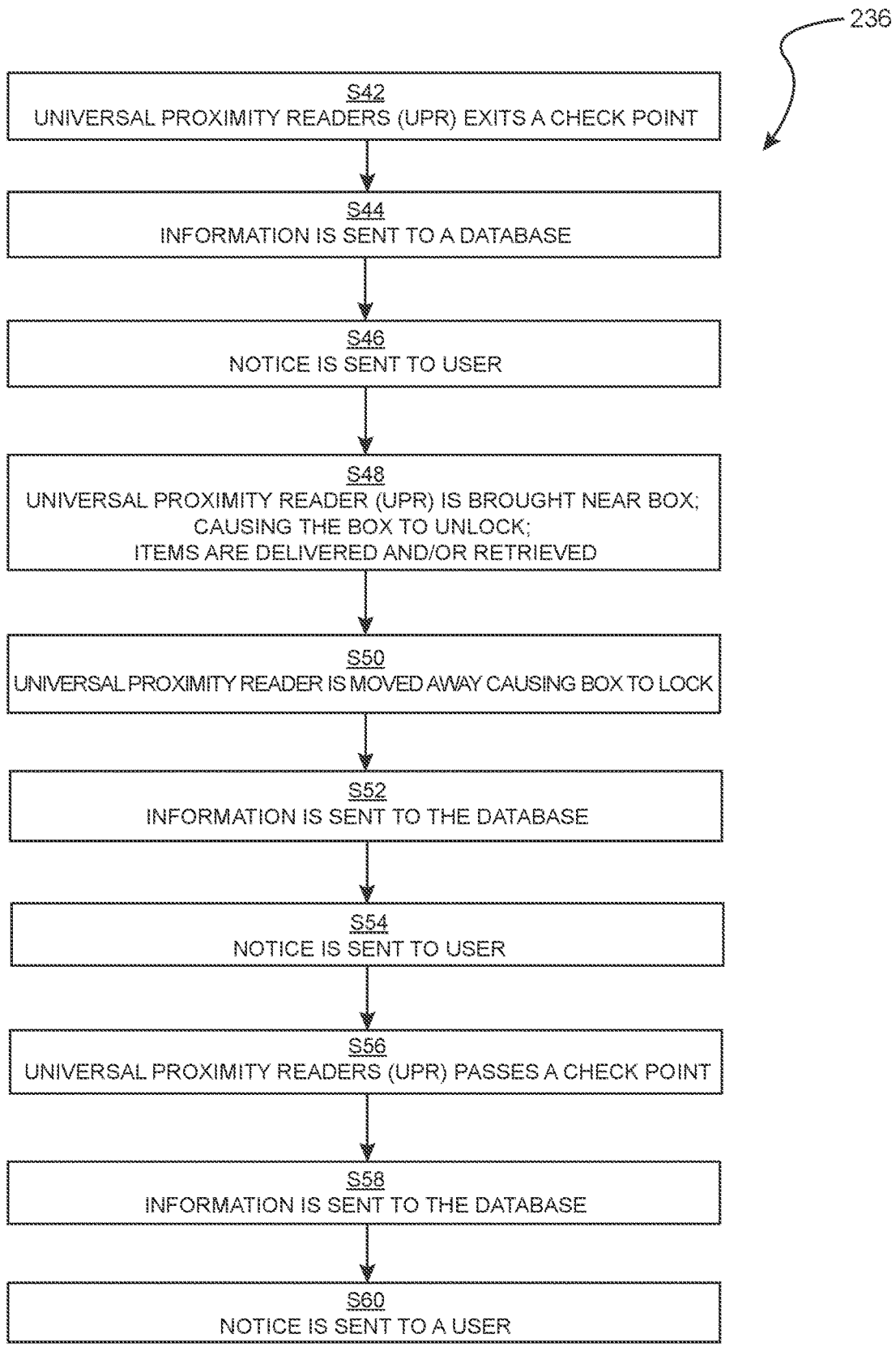
FIG. 13 is a flowchart illustrating a method of securely delivering an item in accordance with the present disclosure.

FIGS. 11 through 13 are flowcharts that illustrate various aspects and steps of methods in accordance with the present disclosure. It should be understood that the order of the steps shown in the figures and describe herein and in the claims is not mandatory (unless specifically stated otherwise) but cited as examples. The order of the steps may be rearranged in accordance with the present disclosure. FIG. 11 is a flowchart, which describes a method 232 of activating universal proximity sensors 42 (also referred to as a delivery proximity sensors 42). The term universal proximity sensor 42 is also used because the universal or delivery proximity sensors 42 may be configured to open all deposit boxes 22, 220 or all deposit boxes 22, 220 located within a defined area (hence it being a "universal" proximity sensor) as opposed to a user's proximity sensor 40 which generally is associated with a single delivery box 22, 220. However, in some aspects, the user's proximity sensor 40 may also be associated with multiple delivery boxes 22, 220 associated with a user (especially when the user is an entity rather than a real person).

As shown in step S10, a delivery service (which may include a government entity such as the U.S. Postal Service or any other delivery service whether public or private) receives universal proximity sensors 42 (as shown in FIG. 1). In step S20, the delivery service may use barcodes on the proximity sensors 42 to swipe and download information and uniquely assigned each proximity sensor a particular delivery point or geographical zones such as, a zip code with the server or database 56. In step S30 the universal proximity sensor 42 may be registered via a computer 58 wireless device 104 as shown in FIG. 1 or any other suitable device. In step S32 the universal proximity sensors 42 may be distributed and associated with the piece of equipment 44 and or specific delivery personnel. For example, a universal proximity sensor 42 may be associated with a specific delivery person or a vehicle 44 or bag 44 as shown in FIG. 1 or 3. Information regarding the proximity sensors 42 in steps S20-S32 can be entered into a computer 58 or other wireless device 104 using an application or computer program, which allows the information to be stored on a database or server 56. Once the universal proximity sensor 42 has been registered it may be activated (authorized) and able to communicate with the box proximity sensors 30 within its delivery route, specific delivery point, geographical zone, or ZIP Code. The delivery service can perform the operation of activating or deactivating each delivery proximity sensor 42 as needed.

FIG. 12 illustrates a method 234 in accordance with present disclosure for activating a specific delivery box 22 or box proximity sensor 30 associated with a specific delivery box 22. As shown in step S34, a user obtains a box security system which may include a deposit box 22 already configured to be in accordance with the system 20 or a kit which (as discussed above) may allow a retrofit of the existing mailbox or other deposit box to be upgraded to contain features associated with the present system 20. As shown in step S36 user may download (or access) from a database 56 or server 56 an application or computer program onto a user's device 104 or computer 58. In step S38 the user may then use the application or program to register the box proximity sensor 30. The registration may include entering a user's information such as name, address, serial number of the deposit box and/or box sensor 30, user's proximity sensor 30 serial number, location of the deposit box 22 and the like. In step S40, the user may then fit the retro kit to an existing deposit box 22 or install a deposit box 22 in accordance with present disclosure. The user, delivery service, and a system 20 operator may activate and deactivate proximity sensors 30, 40, 42, 50A and 50B as needed.

FIG. 13 illustrates a method 236 of delivering an item in a secure manner in accordance with the present disclosure. The following discussion is made with reference to both the flowchart of FIG. 13 and the system shown in FIG. 1. At step S42, a universal proximity sensor 42 exits a checkpoint as detected by the location proximity sensors 50A and/or 50B. As shown in step S44, information that the delivery equipment 44 has passed one of the exit proximity sensors 50A or 50B is sent to the database or server 56. Optionally, as shown in step S46, a notice can be sent to a user's computer 58 or device 104 regarding the passage of the delivery equipment 44. As shown in step S48, when the universal proximity sensor 42 is brought near the box proximity sensor 30 the locking mechanism 32 will unlock the deposit box 22.

When the universal or delivery proximity sensor 42 is moved away from the box proximity sensor 30, the locking mechanism 32 will revert to the lock position as indicated in step S50. As set forth in step S52, information may be sent to the server or database 56 regarding communication between the universal proximity sensor 42 and the box proximity sensor 30. This information can indicate when the deposit box 22 was unlocked, (indicative that a delivery was made or that items were removed from the deposit box 22), whether the deposit box 22 is currently locked, or any other desired information. In step S54, information may be sent to a user's computer 58 or device 104 or merely stored on the server or database 56 to be accessed by user via the device 104 or computer 58.

At step S56 the delivery service equipment 44 may pass a checkpoint containing the location proximity sensors 50A or 50B after returning from making deliveries. Once the building or property line proximity sensors 50A or 50B detect the return of the delivery equipment 44 by detecting the delivery proximity sensor 42, information regarding the return of the delivery equipment 44 may be sent to the database or server 56 at step S58. At step S60 notice regarding the return of the equipment 44 may be sent to a user. It may be understood that the method does not require that notices be sent to a user, as such steps are optional. In some aspects, information is stored on the database or server 56 for later access by the user and may or may not be sent to a user.

In some aspects, the delivery proximity sensor 42 may also contain a GPS transceiver which can transmit wirelessly information to the database or server 56 as to the location of the equipment 44. In some aspects, one or more of the other proximity sensors 30, 40, 50A, and 50B may also contain or be operatively connected to a transceiver which can transmit wirelessly information to the database or server 56.

In additional aspects of the disclosure, the system 20 may be configured to provide a wide range of additional functionality. In particular, the system 20 may be implemented to be an overall solution to packaging, package pick up, and package delivery. In some aspects, customers may be able to use the system 20 to order the deposit box 22, the flexible deposit bag 224, the locking mechanism 32 for their existing mailbox, other components set forth in the disclosure, and the like. Moreover, customers may be able to use the system 20 to order supplies, such as packaging supplies. In this regard, the system 20 may be configured for electronic commerce. More specifically, the system 20 may be implemented to provide mobile commerce, electronic funds transfer, supply chain management, Internet marketing, online transaction processing, inventory management systems, product delivery including shipping, and the like. In this regard, the system 20 may be configured to receive payment from the customer. For example, system 20 may be configured to receive and store a credit card to pay for purchases, and any appropriate one time or monthly fees. Other forms of payment are contemplated as well including electronic funds transfer, debit card, PayPal, and the like.

In one aspect, the disclosed delivery system may be associated with service provided by the system 20 and may be associated with monthly fees or payments. In this regard, the system 20 may be configured to handle one time payments, periodic payments (e.g., monthly fees), and the like. Moreover, the system 20 may be configured to allow customers to query the system 20 on previous purchases, payments, including any one time or monthly fees, returns, supplies purchased, and the like. In particular, the system 20 may be configured to generate an on-line customer interface via the mail service optimization application 106, a web portal, or the like. The system 20 may generate the on-line customer interface for order entry, and all associated customer service functionality as described herein.

The system 20 may be configured to allow business and residential customers to use the on-line customer interface to set up an account, to register a preferred payment solution (e.g., business or personal credit card) to that account to pay for supplies such as mail weighing equipment, stamps, tape, other packing and shipping materials, and the like. The system 20 may be further configured to allow customers to use the preferred payment solution (e.g., a credit card on file) to pay for mail pickup and delivery implemented by the system 20. In one aspect, the system 20 may be configured to support payment solutions such as credit card processing.

Once registered, a customer may use the system 20 to purchase supplies needed to prepare a package for delivery. Once purchased through the on-line customer interface implemented by the system 20, the supplies would be delivered to the customer location, such as via the deposit box 22. The customer would then have their supplies on hand when they are ready to prepare a package for pickup. A customer's preferred payment solution, such as a credit card, already on file in the system 20, may be used to pay for the transaction and payment solution processing would proceed accordingly.

In various aspects, the customer accounts and associated transactions may be serviced through the system 20 and associated interfaces to other systems for activations, sales, fulfillment, delivery, returns and all customer service and security activities.

One aspect of the disclosure includes package pickup. In this regard, customers may prepare packages for pickup as follows. The customer (business or residential) would use the previously purchased supplies obtained through the above-noted electronic commerce solution of the system 20 to properly wrap the package for delivery.

In one aspect, the customer may have an electronic weighing device configured to measure the weight of the package. In one aspect, the electronic weighing device may interface with the system 20 and provide a package weight to the system 20.

The customer may then access the system 20 and begin the process of requesting package pickup, entering all pertinent information. This information may include a destination address so that the system 20 may determine if the destination address is associated with another customer that utilizes the system 20. Within the system 20, the customer may indicate how they would like the package shipped: Standard, Overnight, Two-day delivery, etc.

The customer may then place the package on the weighing device, and the weight of the package may be automatically calculated and provided to the system 20 over the connection 54. All associated shipping charges may be calculated as well, and a total cost may be generated by the system 20 and displayed for the customer on the online customer interface (via the application, web portal, or the like). Thereafter, the customer can utilize the online customer interface to indicate that the package is ready for pickup. For example, the customer selects the "approved for pickup" button graphically generated in the online customer interface. Thereafter, the system 20 can provide the ability for the customer to generate a shipping label for printing. For example, the system 20 can provide a data file that may be printed to form a peel and stick shipping label. In one aspect, the data file may be automatically generated for printing at the customer site. The customer would affix the label to the package for shipping.

The customer may then use the online customer interface generated by the system 20 to enter the date the package would be placed in the deposit box 22 for pickup. Moreover, the customer may use the online customer interface generated by the system 20 to indicate a specific location of the package. For example, whether it would be located in the deposit box 22, the flexible deposit bag 224 (based on the size of the package), or the like. The system 20 may allow a primary delivery company to assign an appropriate secondary delivery company to pick up the package from the customer. The system 20 may thereafter charge the customer utilizing the preferred payment solution (e.g., customer's credit card would be charged) for the transaction and process it accordingly.

In one aspect, if the recipient is also a customer that utilizes the system 20, the customer receiving the package may receive an alert when the package is picked up and delivered just as the sending customer would. If the customer receiving the package is not a customer that utilizes the system 20, only the sending customer may receive an alert when the package is picked up and delivered.

In certain aspects, any package that needs to be picked up for delivery to another address may have a distinctive printed shipping label indicating the same. For example, a blackened right corner that can be ripped off when the package is picked up. This will be very visible to delivery personnel and allow them an easy way to make sure they are picking up the right package.

As previously noted, the system 20 may be configured to allow each customer to make monthly or one-time fees or other payments and to have those payments processed accordingly.

In a further aspect of the disclosure, the system 20 may be utilized to support multiple delivery companies. In this regard, the system 20 may be implemented by a single primary delivery company. The primary delivery company may then allow secondary delivery companies to utilize the system 20. However, the primary delivery company may maintain a level of control and operation of the system 20 as described below.

In one aspect, the system 20 may also be accessible by the primary delivery company and/or any other secondary delivery companies. Additionally, the system 20 may be configured to provide residential and business customers, the secondary delivery companies, and the primary delivery company various levels of customer service through an on-line customer interface. In this regard, the system 20 may be configured to be accessible for customer service personnel to service account inquiries, issues, returns and all other transactions and account activities. Moreover, the system 20 may include interfaces to any other components and systems of the disclosure.

In one aspect, the primary delivery company may have the ability to approve or decline system and equipment access or the ability to perform any function at any level at any time temporarily or permanently on the system 20 for any secondary delivery companies. The primary delivery company may have the ability to assign or re-assign, turn on or turn off any transmitter or other equipment sold or assigned through the system 20, temporarily or permanently. The primary delivery company may also have the ability to assign and re-assign groups of and types of transmitters (truck, wristlet, mailbag, or the like) to the secondary delivery companies on the system 20.

The primary delivery company can also override any decision made by a secondary delivery companies in the system 20. All required interfaces to the primary delivery company and the secondary delivery companies existing systems may be established to allow transfer and access of required data through the system 20. Interfaces may also be in place to allow processing of orders, returns and of any credit card transactions for customers.

The primary delivery company may utilize the system 20 to freeze, cancel, de-activate, assign, or re-assign any transmitter or account for security or other pre-defined reasons. The primary delivery company may charge any secondary delivery companies for any transmitter or other equipment assigned if lost or stolen through the system 20. The primary delivery company may have access to all transmitter activity and override capability in case of a security breach through the system 20.

The primary delivery company may be able to assign transmitters within the primary delivery company by region or other geographic area through the system 20. The primary delivery company may be able to process and track activity and transactions and then query and report on them at the regional level within the primary delivery company through the system 20. The primary delivery company may be able to allow its regions to purchase supplies and equipment at the regional level within the primary delivery company through the system 20. The primary delivery company may be able to assign and track transmitters at the regional level within the primary delivery company through the system 20. The regional level may be defined as a zip code or other geographic area.

The primary delivery company may be able to configure and assign transmitters to the primary delivery company regions and to the secondary delivery companies through the system 20. The transmitters may be requested in the system 20 by the secondary delivery companies, and then sent to the secondary delivery companies and then accessed in the system 20 through the secondary delivery company's account to be registered, activated, and tracked.

In certain aspects, the secondary delivery companies may also have a number of capabilities in the system 20. Authorized secondary delivery companies may be able to request and receive access to the system 20 from the primary delivery company for account set up and management, transmitter registration, assignment, management, activation and de-activation, and activity tracking and reporting. Each registered secondary delivery company may have access to their data only through the system 20.

When a new secondary delivery companies wants access to the system 20, the system 20 may authenticate the delivery company, prior to allowing access and set up of that company's account. Once authenticated, the secondary delivery company may have access to the system 20 to set up their profile, order and manage their transmitters, and to track and report on associated package pickup and delivery activity.

Each individual secondary delivery company may have the ability to purchase supplies and equipment, and may have access to the system 20 as required to service their accounts.

Each individual secondary delivery company may have the ability to perform all of the functions as described herein with oversite of the primary delivery company through the system 20. Each secondary delivery company may have the ability to deny access to the system 20 at the customer level for security purposes. Any denial at this level may immediately alert the primary delivery company through the system 20.

In some aspects, the system 20 may interface with a number of systems within various delivery companies, such as the United States Postal Service and other delivery companies. For example, these companies may already have package pickup and delivery systems in place that will need to pass and share data. For example: A secondary delivery company that already has a scheduling system in place may provide an interface to update the system 20 when a package is scheduled for delivery to or pick up from a specific address so that an alert can be provided.

The secondary delivery companies may be able to assign transmitters within the secondary delivery company by region or other geographic area through the system 20. The secondary delivery companies may be able to process and track activity and transactions and query and report on them at the regional level within the secondary delivery companies through the system 20. The secondary delivery companies may be able to allow its regions to purchase supplies and equipment at the regional level within the secondary delivery companies through the system 20. The secondary delivery companies may be able to assign and track transmitters at the regional level within the secondary delivery companies through the system 20. The regional level may be defined as a zip code or other geographic area.

Each secondary delivery company may have the ability to turn any of its assigned transmitters on or off temporarily or permanently through the system 20. Any secondary delivery companies may have the ability to assign and re-assign groups of and types of transmitters (truck, wristlet, mailbag, or the like) assigned to that secondary delivery companies by the primary delivery company through the system 20.

All secondary delivery companies and customer activity may be tracked in the system 20 with activity alerts sent to consumers when packages have been picked up or delivered in accordance with the disclosure.

The system 20 may also be configured to allow assessment or payment by each secondary delivery companies of any monthly or one-time fees or payments required and to have those payments processed accordingly.

Security is a critical concern. In this regard, the system 20 may have state of the art security to track transmitters and mailbox locks. The system security may monitor account activity at all levels and may provide strong alerts for suspicious or potentially harmful activity. Any account, mailbox lock or transmitter could be automatically terminated if a security breach is suspected by the system. There may be a security module within the system 20 that may allow high-level security personnel in the primary delivery company and secondary delivery companies to establish and monitor access and other security rights and activities. Security management may have the ability to query the system 20 at any time for up to date reports on activity and users.

In further aspects, the system may track, generate, and provide Reporting & Audit Data. In this regard, the system 20 may be configured to track and provide on-line queries and reports to the primary delivery company on each transaction, request, or alert at each level (primary delivery company, secondary delivery companies, Customer).

In some aspects, the system 20 may track and provide on-line reporting for the primary delivery company on all equipment and transmitters assigned to secondary delivery companies at the secondary delivery company's level.

In some aspects, the system 20 may track and provide on-line queries and reports to each individual secondary delivery companies for each transaction, request, or alert at the secondary delivery companies or Customer level.

In some aspects, the system 20 may track and provide on-line queries and reports to each individual customer for each transaction, request, or alert at the customer level.

In some aspects, the system 20 may track and report on all the system 20 sales, transactions, activities and service at the customer level.

In some aspects, the system 20 may track and report on all access and associated activity as defined within secondary delivery companies and primary delivery company levels.

Any activity can be monitored or report generated at any level for the primary delivery company security personnel at any time for audit of security purposes through the system 20.

All reporting data may be available at the individual level and at the highest summary level through the system 20.

Access and utilization of the system 20 may include various fees. In one aspect, a one-time fee may be charged for customers to activate their system 20 account. In one aspect, a monthly fee may be charged for residential customers to access the system 20 and receive alerts associated with their activity. In one aspect, a one-time fee may be charged for business customers to activate their system 20 account. In one aspect, a monthly fee may be charged for business customers to access the system 20 and receive alerts associated with their activity. This fee may vary based on the size of the business. In one aspect, a one-time fee may be charged for each secondary delivery company to activate their system 20 account. In one aspect, a monthly fee may be charged to each secondary delivery company for access to the system 20. This fee may vary based on the size of the secondary delivery company or the number of transmitters in use. In one aspect, a secondary delivery company may be charged a monthly fee per transmitter or number of transmitters by the primary delivery company. In one aspect, a primary delivery company's regions may be charged a monthly fee per transmitter or number of transmitters. In one aspect, a monthly fee may be charged for certain supplies purchased through the system 20. In one aspect, accounts may be charged for supplies purchased through the system 20. In one aspect, accounts may be charged for package pickup and delivery through the system 20. In one aspect, fees may be charged to secondary delivery companies by the primary delivery company for lost or stolen transmitters.

While the disclosure has been described in terms of exemplary aspects, those skilled in the art will recognize that the disclosure can be practiced with modifications in the spirit and scope of the appended claims. These examples given above are merely illustrative and are not meant to be an exhaustive list of all possible designs, aspects, applications or modifications of the disclosure.

The many features and advantages of the invention are apparent from the detailed specification, and thus, it is intended by the appended claims to cover all such features and advantages of the invention which fall within the true spirit and scope of the invention. Further, since numerous modifications and variations will readily occur to those skilled in the art, it is not desired to limit the invention to the exact construction and operation illustrated and described, and accordingly, all suitable modifications and equivalents may be resorted to, falling within the scope of the invention.

What is claimed is:

1. An integrated package and mail delivery security system, the integrated package and mail delivery security system being configured to limit access to a delivery box, the delivery box configured to be located at a delivery location and the delivery box comprising an enclosed space to receive delivery of a package and/or mail, the integrated package and mail delivery security system comprising:
   a lock mechanism, the lock mechanism configured to attach to or be integrated within the delivery box to selectively prevent a door of the delivery box from opening;
   the lock mechanism configured to have a locked configuration that prevents the door of the delivery box from opening;
   the lock mechanism further configured to have an unlocked configuration that allows the door of the delivery box to open;
   the lock mechanism further including a lock body;
   the lock body comprising a movable bolt that retracts into the lock body and extends from the lock body to implement the locked configuration that prevents the door of the delivery box from opening and the unlocked configuration that allows the door of the delivery box to open;
   a proximity sensor configured to detect an element associated with delivery of the package and/or mail to the delivery box by authorized delivery personnel;
   the proximity sensor further configured to operate the lock mechanism to move the movable bolt to place the lock mechanism in the unlocked configuration that allows the door of the delivery box to open during the delivery of the package and/or mail to the delivery box by the authorized delivery personnel;
   a transceiver operatively connected to the lock mechanism and the transceiver configured to transmit a signal indicative of operating the lock mechanism on a communication channel over a wireless network to a system;
   a power source configured to provide electrical or battery power to at least the proximity sensor and the transceiver; and
   a lock receiver configured to be attached to the door of the delivery box, the lock receiver configured to receive the movable bolt,
   wherein part of the system is remotely located away from the delivery box and the delivery location;
   wherein the system is configured to receive the signal indicative of operating the lock mechanism from the transceiver over the wireless network;
   wherein the system being further configured to transmit a message on a communication channel over a network to a user device regarding operation of the lock mechanism,
   wherein the user device comprises at least one of the following: a computer and a wireless device;
   wherein the message comprises an indication of the lock mechanism being unlocked; and
   wherein the system comprises at least one server and at least one database.

2. The integrated package and mail delivery security system of claim 1 wherein:
   the user device comprises the wireless device and the wireless device being implemented as a mobile phone that implements an application;
   the system is further configured to register the lock mechanism by receiving registration information from the user device of a user of the lock mechanism through the application; and
   the registration information comprises at least one of the following: a user name, a user address, a serial number of the lock mechanism, a serial number of the delivery box, and a location of the delivery box.

3. The integrated package and mail delivery security system of claim 1 wherein the lock receiver is configured to be attached to the door of the delivery box with mechanical fasteners.

4. The integrated package and mail delivery security system of claim 1 wherein the lock mechanism is configured to be arranged external to the delivery box.

5. The integrated package and mail delivery security system of claim 1 further comprising:
   a bag, the bag comprising an attaching member configured to attach to a securing member located in an interior space of the delivery box; and
   a passageway in the delivery box sized and dimensioned to allow the attaching member to pass through the passageway to attach to the securing member in the interior space when the bag is outside of the interior space.

6. The integrated package and mail delivery security system of claim 1 wherein the system is further configured to generate an on-line customer interface in the user device.

7. The integrated package and mail delivery security system of claim 6 wherein the system generating the on-line customer interface further being configured for receiving an indication that a package is ready for pickup at the delivery box.

8. The integrated package and mail delivery security system of claim 6 wherein the system generating the on-line customer interface further being configured for generating a shipping label for printing.

9. The integrated package and mail delivery security system of claim 6 wherein the system generating the on-line customer interface further being configured for receiving a date indicating when a package is ready for pickup at the delivery box.

10. The integrated package and mail delivery security system of claim 6 wherein the system generating the on-line customer interface further being configured for receiving a specific location of a package for pickup.

11. The integrated package and mail delivery security system of claim 6 wherein the system generating the on-line customer interface further being configured to interface with an electronic weighing device configured to provide a package weight to the system.

12. The integrated package and mail delivery security system of claim 6 wherein the system generating the on-line customer interface further being configured to generate an alert in the user device when a package is picked up and when the package is delivered.

13. An integrated package and mail delivery security system, the integrated package and mail delivery security system being configured to limit access to a delivery box, the delivery box configured to be located at a delivery location and the integrated package and mail delivery security system comprising:
- a lock mechanism, the lock mechanism configured to attach to the delivery box to selectively prevent a door of the delivery box from opening;
- the lock mechanism configured to have a locked configuration that prevents the door of the delivery box from opening;
- the lock mechanism further configured to have an unlocked configuration that allows the door of the delivery box to open;
- the lock mechanism further including a lock body;
- the lock body comprising a movable bolt that retracts into the lock body and extends from the lock body to implement the locked configuration that prevents the door of the delivery box from opening and the unlocked configuration that allows the door of the delivery box to open;
- a proximity sensor configured to detect an element associated with delivery of a package and/or mail to the delivery box by authorized delivery personnel;
- the proximity sensor further configured to operate the lock mechanism to move the movable bolt to place the lock mechanism in the unlocked configuration that allows the door of the delivery box to open during a delivery of the package and/or mail to the delivery box by the authorized delivery personnel;
- a power source configured to provide electrical or battery power to at least the proximity sensor; and
- a transceiver operatively connected to the lock mechanism and the transceiver configured to transmit a signal indicative of operating the lock mechanism on a communication channel over a wireless network to a system,
- wherein part of the system is remotely located away from the delivery box and the delivery location;
- wherein the system is configured to receive the signal indicative of operating the lock mechanism from the transceiver over the wireless network;
- wherein the system being further configured to transmit a message to a user device regarding operation of the lock mechanism;
- wherein the user device comprises at least one of the following: a computer and a wireless device;
- wherein the message comprises an indication of the lock mechanism being unlocked; and
- wherein the system comprises at least one server and at least one database.

14. The integrated package and mail delivery security system of claim 13 further comprising the delivery box;
- the delivery box comprising an enclosed space to receive delivery of, or retrieve the package and/or mail;
- the delivery box comprising the door that is configured to selectively provide access to the enclosed space and the door further configured to selectively prevent access to the enclosed space; and
- a lock receiver configured to be attached to the door of the delivery box, the lock receiver configured to receive the movable bolt.

15. The integrated package and mail delivery security system of claim 14
- wherein the lock receiver is configured to be attached to the door of the delivery box with mechanical fasteners; and
- wherein the lock mechanism is configured to be arranged external to the delivery box.

16. The integrated package and mail delivery security system of claim 13 further comprising:
- a bag, the bag comprising an attaching member configured to attach to a securing member located in an interior space of the delivery box; and
- a passageway in the delivery box sized and dimensioned to allow the attaching member to pass through the passageway to attach to the securing member in the interior space when the bag is outside of the interior space.

17. The integrated package and mail delivery security system of claim 13 wherein the system is further configured to generate an on-line customer interface in the user device.

18. The integrated package and mail delivery security system of claim 17 wherein the system generating the on-line customer interface further being configured for receiving an indication that a package is ready for pickup at the delivery box.

19. The integrated package and mail delivery security system of claim 17 wherein the system generating the on-line customer interface further being configured for generating a shipping label for printing.

20. The integrated package and mail delivery security system of claim 17 wherein the system generating the on-line customer interface further being configured for receiving a date indicating when a package is ready for pickup at the delivery box.

21. The integrated package and mail delivery security system of claim 17 wherein the system generating the on-line customer interface further being configured for receiving a specific location of a package for pickup.

22. The integrated package and mail delivery security system of claim 17 wherein the system generating the on-line customer interface further being configured to interface with an electronic weighing device configured to provide a package weight to the system.

23. The integrated package and mail delivery security system of claim 17 wherein the system generating the on-line customer interface further being configured to generate an alert in the user device when a package is picked up and when the package is delivered.

* * * * *